Feb. 3, 1970　　　　　A. QUENOT　　　　3,493,190

AUTOMATIC RETURN DEVICE FOR TAPE MEASURING

Filed July 24, 1967

United States Patent Office 3,493,190
Patented Feb. 3, 1970

3,493,190
AUTOMATIC RETURN DEVICE FOR
TAPE MEASURING
André Quenot, Besançon, Doubs, France, assignor to Quenot & Cie S.a.r.l., Besançon, France, a corporation of France
Filed July 24, 1967, Ser. No. 655,545
Claims priority, application France, Oct. 19, 1966, 80,623
Int. Cl. B65h 75/16
U.S. Cl. 242—84.8         10 Claims

ABSTRACT OF THE DISCLOSURE

A tape measure for making inside and outside measurements has a window for reading calibrations on the outer side of the tape and guides for guiding the tape in a fixed path and maintaining a constant tape length between the window and a tape outlet opening in the casing. A drum on which the tape is wound and a tape drive roller adjacent the outlet opening are both driven to transport the tape through the guides and rewind it on the drum.

---

The automatic return of the tapes of linear measuring instruments poses numerous problems. Although it is possible for short tapes, to make devices permitting this return under good conditions, the same is not true for longer tapes, in particular when linear measuring instruments for making internal measurements are involved.

In such instruments, the tape is guided inside the casing along a trajectory of constant dimensions. Regardless of the manner in which this guiding is effected, it occasions considerable friction.

This friction is partially proportional to the length of the guiding means, which length increases with the length of the tape. It is also associated with the force exerted by the return system which tends to apply the tape against the curvilinear inner guiding device in such a way that the increase of such a force leaves unaltered this problem.

It has accordingly been suggested to decrease the friction by guiding the tape by means of rollers. However, experience has shown that in the normal use positions of the instrument, this solution was not sufficient, especially when the withdrawn part of the tape overhangs.

Consequently, the invention proposes to furnish an automatic return device for the tape of a linear measuring instrument for internal reading which will be of certain operations and without shocks, even in the case of tapes of considerable length.

To this effect, the invention is concerned with an automatic return device for the tape of linear measuring instruments for internal measurements, characterized by tape drive roller means comprising at least one roll, or equivalent rollers, at the outlet of the tape and by return means actuating the tape drive roller means.

The invention will be better understood by referring to the following description made by way of non-limiting example as well as to the accompanying drawing in which.

Figure 1:
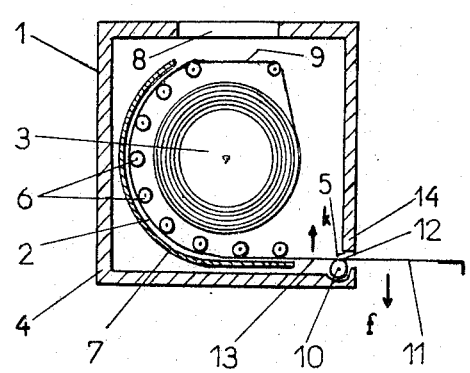
FIGURE 1 is a cross-sectional view of a linear measuring instrument with a tape guided by inner rollers and an outer rib and by an exit roll.

Reference is made to FIGURE 1.

Linear measuring instrument 1 comprises a tape measure 2, for example, of metal. Tape 2 is wound around a drum 3 inside a casing 4. It comes out of the casing by outlet 5 after having been guided along a constant trajectory between an inner curving linearly-arranged set of rollers 6. A rib 7, or a second row of rollers prevents tape 2 from leaving rollers 6.

A window 8 permits reading tape 2 the portion 9 of which located below window 8 being rectilinear in the described example.

Under tape 2, at outlet 5, is located a roller 10. Roller 10 supports the weight of the overhanging withdrawn portion 11 of tape 2. Roller 10 makes it possible to eliminate substantially the major part of the considerable friction at support point 12.

Tape 2 having a certain rigidity, the weight of its withdrawn part 11 acting along arrow $f$ causes a pressure on roll 10 which tends to lift the horizontal part 13 of tape 2 located inside casing 4 along arrow $k$, and tends to move it away from rib 7. In this case, the part 13 of tape 2 will come to bear against rollers 6. Rib 14 is associated with roller 10.

Figure 2:
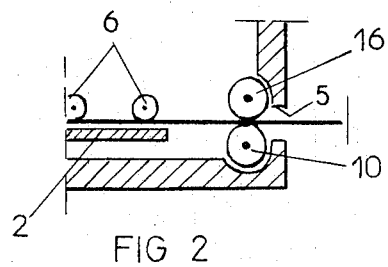
FIGURE 2 represents the outlet with two rolls.
Figure 3:
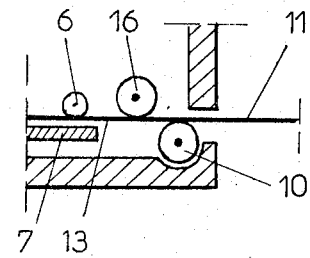
FIGURE 3 shows another arrangement of the outlet with two rolls.

Reference is made to FIGURES 2 and 3.

It is possible to use an additional press roller 16 above the horizontal part 13 of the tape. This roller 16 can be located above roller 10 as shown in FIGURE 2 or can be shifted inwardly of casing 4 as shown in FIGURE 3.

Naturally, the guiding devices at outlet 5 described above can be used with any other inner guiding system for tape 2, such, for example, as a guiding system consisting of two continuous ribs placed on either side of the tape or a system with an inner rib, and external dogs or lugs or a system of inner rollers and of external dogs or lugs or all combinations of ribs, of rollers and of lugs.

Rollers 6, 10 and 16 can assume various shapes. They can have a peripheral surface which is laterally concave or convex. In the case of rollers 16 and 10, one surface can be convex and the other concave.

Figure 4:
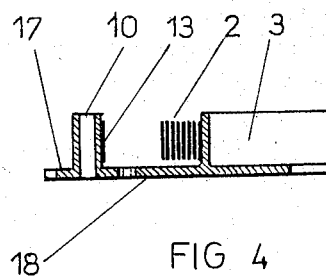
FIGURE 4 shows a cross-sectional view of the driven outlet roller.
Figure 5:
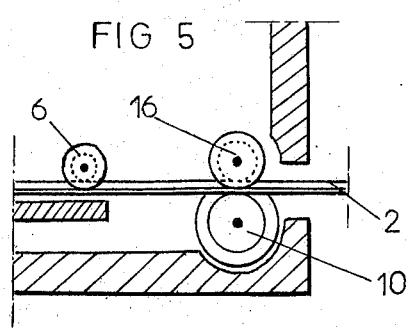
FIGURE 5 represents the outlet of the tape driven by an exit roller.

Reference is made to FIGURES 4 and 5.

In a modification of the invention, roller 10 is driven by the return system (not shown) of tape 2. For this purpose, roller 10 is fast with the toothed wheel 17. This toothed wheel 17 is actuated by a toothed crown 18 fast on drum 3. When the return system causes drum 3 to turn, the latter, by the intermediary of crown 18 and gear 17, drives roller 10. The rotational speed of roller 10 depends upon the ratio of the diameters of wheel 17 and crown 18. This ratio is selected in such a way that the tangential speed of roller 10 is near the re-entry speed of tape 2.

Roller 10 thus driven can be associated with a guiding rib such as rib 14 or with a roller 16 as shown on FIGURE 5 in which roller 10 is concave and roller 16 convex in order to ensure good gripping of tape 2. Roller 16 can be freely mounted or driven, for example, by roller 10 by means of a system of gears (not shown).

Rollers 10 and 16 can be made of a material having a high coefficient of friction for tape 2.

By way of modification there can be selected a diameter ratio for gear 17 and crown 18 which permits rollers 10 and 16 to turn at a speed greater than the entrance speed of tape 2, itself equal to the winding speed of this tape around drum 3.

Said rollers 10 and 16 tend then to make tape 2 return at a speed greater than the normal re-entry speed which tends to diminish the tension of the already rewound part of the tape ribbon to reduce the friction thereof on the guiding system consisting, for example, of rollers 6 thus permitting a certain and easy re-entry.

Naturally, the modification above described is amenable of all types of modifications and there can be associated one or two exit rollers, at least one of which is driven by the return system of the tape, with any inner guiding system.

Figure 6:
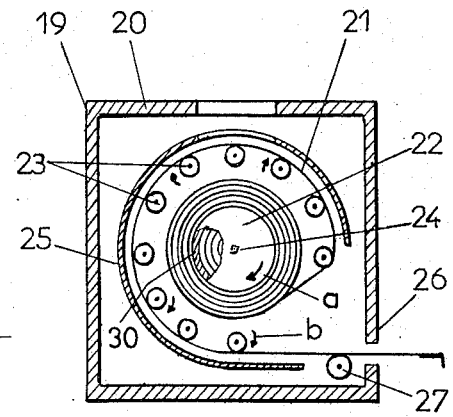
FIGURE 6 shows cross-sectionally a tape instrument guided by inner driven rolls disposed along a circle and by an exit roller.

Reference is made to FIGURE 6.

The linear measuring instrument 19 similar to the measuring instrument 1 is constituted by casing 20 in which a tape 21 is wound around a drum 22. A return system is shown schematically as a spiral spring 30 inside the drum 22. The spring 30 is tensioned by rotation of the drum in a counterclockwise direction when the tape is drawn out of the exit 26 and thereby stores energy to rotate the drum in a clockwise direction to rewind the tape when the tape is released. Said tape 21 is guided inside casing 20 by rollers 23 all equidistant from shaft 24 of drum 22. In order not to move away from rollers 23, tape 21 is also guided by an outer rib 25.

Rollers 23 are driven by a crown from the drum 22 so that the rollers are fixed in the unwinding and winding up of the tape.

Tape 21 is also guided at exit 26 of casing 20 by a free roller 27 similar to previous rollers 10. This roller 27 can be associated like a roller 10 to a rib or to another roller located on the other side of tape 21.

When the return system winds drum 22 in the direction of arrow *a* rollers 23, preferably made in a material permitting a good driving of tape 21 turn in the direction of arrows *b*, thus facilitating the re-entry of tape 21.

Naturally, it is also possible, in a modification, to drive roller 27 by suitable means, for example, similar to those of FIGURE 4 or still to drive another roller located possibly in front of roller 27 on the other side of tape 21 or to drive both rollers simultaneously.

Rollers such as rollers 23 and 27 can also have all types of shapes or can be replaced by small drums.

The driving of the guiding means is not limited to the above described examples and the invention is also concerned with the driving of all or part of these guiding means by guiding means such as gears, friction or other.

Alhtough the invention has been described with respect to one particular embodiment thereof, it is understood that the same is in no way limited thereto and that there can be brought various modifications of shape and of materials without thereby departing from the spirit and scope of the invention.

What is claimed is:

1. A tape measure comprising a casing having a peripheral wall including a bottom portion and a top portion and opposite side walls, a drum rotatably mounted centrally in said casing between said side walls, a tape wound on said drum in spiral convolutions and having an inner end secured to said drum, said tape having scales on both inner and outer sides, an outlet opening for said tape in said peripheral wall adjacent said bottom portion, a transparent window in said top portion of said peripheral wall, guide means for positioning a portion of the outer convolution of said tape in position for the scale on the outer side of said tape to be viewed through said outer window and for guiding said tape in a fixed path between said window and said outlet opening and maintaining a constant length of tape between said outlet opening and said window, said guide means frictionally impeding movement of said tape therethrough, drive means for rotating said drum in a direction to rewind said tape on said drum and thereby retract a portion of said tape that has been drawn out through said outlet opening, tape drive roller means frictionally engaging said tape adjacent said outlet opening including a roller engaging the outer surface of said tape, and means for driving said tape drive roller means at a fixed speed relative to said drum at least as great as the return speed of said tape into said casing, said tape drive roller means and said drum drive means applying retracting force to said tape ahead of and behind said guide means to overcome the friction of said guide means and transport said tape through said guide means and rewind it on said drum.

2. A tape measure according to claim 1, wherein said casing is recessed adjacent said outlet opening to receive said roller.

3. A tape measure according to claim 1, wherein said tape drive roller means comprises a second roller positioned to engage the inner surface of said tape, one of said rollers being driven by said driving means.

4. A tape measure according to claim 3, wherein said roller engaging the outer surface of said tape is driven.

5. A tape measure according to claim 3, wherein said rollers are directly opposite one another.

6. A tape measure according to claim 3, wherein said roller engaging the inner surface of said tape is offset inwardly from said outlet opening relative to said roller engaging the outer surface of said tape.

7. A tape measure according to claim 1, wherein a driven tape-engaging roller of said tape drive roller means has a peripheral surface having a high coefficient of friction with respect to said tape.

8. A tape measure according to claim 1, wherein said driving means for said tape drive roller means comprises meshing gears on said roller and said tape drum respectively.

9. A tape measure according to claim 8, wherein said gears have a gear ration to drive said roller at a tangential speed approximately equal to the return speed of said tape into said casing.

10. A tape measure according to claim 8, wherein said gears have a gear ration to drive said roller at a tangential speed greater than the return speed of said tape into said casing.

References Cited

UNITED STATES PATENTS

| | | | |
|---|---|---|---|
| 537,082 | 4/1895 | Stuart | 33—139 |
| 2,380,671 | 7/1945 | Nelson | 242—84.1 |
| 2,544,908 | 3/1951 | Winston | 33—138 |
| 2,776,096 | 1/1957 | Isbell | 242—84.1 |
| 3,255,531 | 6/1966 | Anderson | 242—84.8 X |
| 3,325,116 | 6/1967 | Quenot | 242—84.8 |
| 3,363,666 | 1/1968 | Hodgson et al. | 242—67.1 X |

FOREIGN PATENTS 1,452,742  9/1966  France.

NATHAN L. MINTZ, Primary Examiner